No. 608,622. Patented Aug. 9, 1898.
J. C. PEASE.
ICE VELOCIPEDE.
(Application filed May 21, 1897.)

(No Model.)

Witnesses
Wm H. Edwards Jr
Victor J. Evans

Inventor
Jules C. Pease
By John Wedderburn.
Attorney

UNITED STATES PATENT OFFICE.

JULES C. PEASE, OF NORTHEAST CARRY, MAINE.

ICE-VELOCIPEDE.

SPECIFICATION forming part of Letters Patent No. 608,622, dated August 9, 1898.

Application filed May 21, 1897. Serial No. 637,547. (No model.)

*To all whom it may concern:*

Be it known that I, JULES C. PEASE, of Northeast Carry, in the county of Piscataquis and State of Maine, have invented certain new and useful Improvements in Ice-Velocipedes; and I do hereby declare the following to be a full, clear, and exact description of the invention, such as will enable others skilled in the art to which it appertains to make and use the same.

My invention relates to certain new and useful improvements in ice-velocipedes, the object being to provide a simple and effective construction of velocipede which may be propelled over a surface of ice or snow.

To this end my invention consists in certain novel constructions, combinations, and arrangements of parts, as will be hereinafter more fully described, and specifically set forth in the appended claims.

Figure 1:
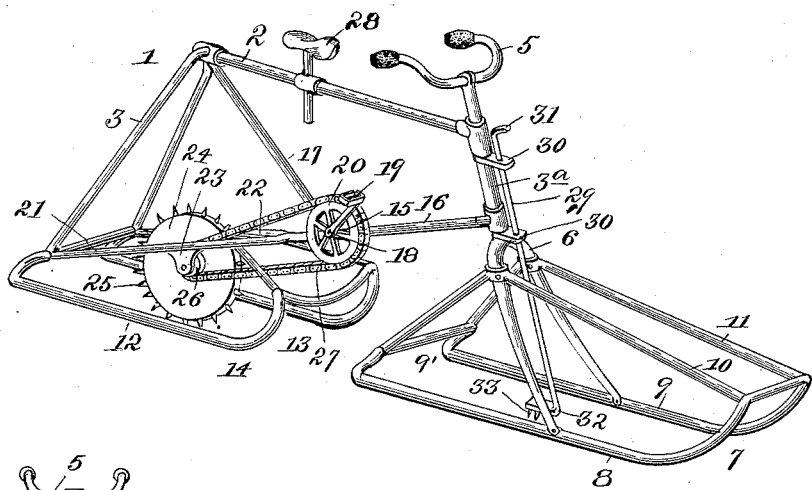
Figure 2:
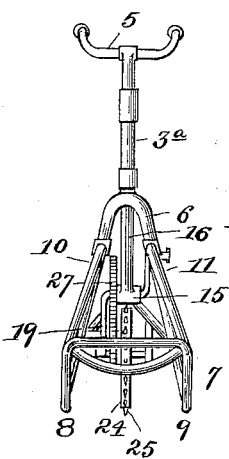
Figure 3:
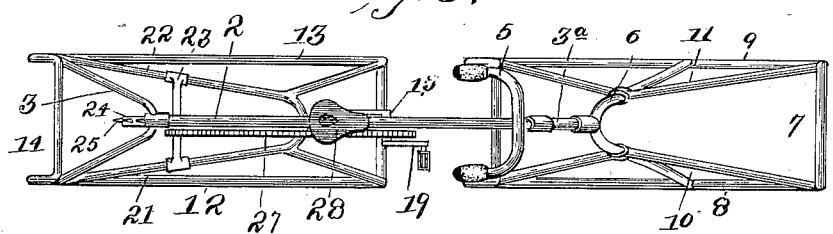

In the accompanying drawings, Figure 1 is a perspective view of a velocipede constructed in accordance with my invention. Fig. 2 is a front elevation view of the same, and Fig. 3 is a top plan view thereof.

Like numerals of reference designate like parts throughout the several figures of the drawings.

Referring to the drawings, the numeral 1 designates the frame of a machine having a top run or upper horizontal bar 2, rear-fork bars 3, connected therewith at the rear end, and a steering-head tube 3ª, attached thereto at the front end. A shank handle-bar 5 extends down from the said steering-head tube and is connected with the front fork 6, as in the ordinary construction of bicycles.

The front forks are mounted upon a runner 7, having two spaced sides 8 and 9, with an opening between them, the said forks being connected to the said sides of the runner. The rear ends of the two sides of the runner are connected by a cross-bar 9' and have their front ends turned or curved upward and also connected by a cross-bar. A brace-rod 10 connects between one of the side arms of the fork and the runner side 8, and another brace-rod 11 connects between the other runner side 9 and the opposite fork-arm. By this construction the connection between the fork and runner is made to resist strain and to prevent injury to the runner and fork when the runner strikes an obstruction of any kind.

The rear fork 3 has its arms connected with the two sides 12 and 13 of the rear runner 14, which is constructed substantially like the front runner 8. A crank-hanger 15 is supported by two hanger or brace rods 16 and 17, extending from the front and rear forks, respectively, and a crank-shaft 18, carrying pedals 19, and a drive sprocket-wheel 20 is mounted in the crank-hanger in the ordinary manner. Two inclined lower runs 21 and 22 connect between the crank-hanger and the two spaced sides 12 and 13 of the rear runner 14, being connected therewith adjoining the heel end of the runner. These lower runs are provided with bearing-boxes 23, in which the shaft ends of a spur-wheel or rear drive-wheel 24 are journaled. The spur-wheel is provided around its periphery with projecting spurs or teeth 25, which are adapted to penetrate the ice or snow, and thereby propel the machine over the surface of the same. This spur-wheel occupies the space between the two sides 12 and 13 of the rear runner 14, and is provided with a sprocket-ring 26, rigidly connected therewith. A drive-chain 27 extends between the said sprocket-ring 26 and the sprocket 20 of the crank-shaft 18, whereby motion is transmitted from the drive-sprocket to the said spur-wheel. It will be seen that the lower run 21 connects between the crank-hanger and the heel end of the rear runner 14, and between these points is provided with bearing-boxes, in which the shaft ends of the spur-wheel are journaled. By this construction the parts named are suspended and maintained in proper relation to each other. A seat 28 is supported upon the upper run or horizontal bar 2 of the frame.

A brake comprises a rod 29, movable through guide-openings in plates 30, connected with the front fork 4. The upper end of this rod is provided with a handle 31, which is arranged in convenient position to the handle-bars 5 of the velocipede, and the lower end of the rod is provided with a brake-shoe 32, having a series of downwardly-projecting teeth 33, adapted to penetrate the surface of the ice or snow over which the velocipede is moving, and thereby arrest the progress of the velocipede. This brake-rod has position between the two fork-arms of the front fork and the two sides 8 and 9 of the front runner 7, so that when the brake is applied it bears upon the surface of the ice in a straight line with the direction in which the machine is moving and does not project to one side of the shoe, which would have a tendency to cause the machine to slue or turn toward that side whenever the brake is applied.

As shown, the rod 29 extends downward in a line approximately parallel with the axial line of the steering-rod of the frame, by means of which the brake-shoe 32 remains in a central position and in the line of direct movement of the velocipede regardless of the direction in which the front runner is turned relative to the general direction of movement.

My invention provides a simple and durable construction of ice-velocipede which may be manufactured at a comparatively small cost and possesses advantages peculiar to its construction alone.

Having thus described my invention, what I claim as new, and desire to secure by Letters Patent, is—

1. In an ice-velocipede, the combination of a frame provided with drive mechanism, a front runner comprising two spaced sides, a front fork carrying handles and having its lower fork-arms connected respectively to the opposite sides of the runner, and a brake comprising a rod movable in guides on said fork and provided at its upper end with a handle and at its lower end with a shoe provided with penetrating devices, the said shoe having position in the space between the two sides of the runner at a point approximately in alinement with the axial line of said front fork, substantially as described.

2. In an ice-velocipede, the combination of a frame having an upper run and rear fork and a front fork provided with handles, two sled-runners each having two spaced sides with an open space between them and connected respectively with the fork-arms of the front and rear forks, a crank-hanger supported by braces from the front and rear forks, sprocket drive mechanism connected with the crank-hanger, a sprocket-wheel having position between the two spaced sides of the rear runner, two lower runs connecting between the crank-hanger and the heel end of the rear runner and provided with bearing-boxes in which the shaft ends of the spur-wheel are journaled, and drive mechanism between the said spur-wheel and drive-sprocket, substantially as described.

In testimony whereof I have signed this specification in the presence of two subscribing witnesses.

JULES X C. PEASE.
his mark

Witnesses:
MILLARD METCALF,
Z. A. MERSEREAU.